(12) United States Patent
Treat et al.

(10) Patent No.: US 10,721,065 B2
(45) Date of Patent: Jul. 21, 2020

(54) ACTIVE STATE BLOCKCHAIN SYNCHRONIZATION

(71) Applicant: Accenture Global Solutions Limited, Dublin (IE)

(72) Inventors: David Treat, Ridgefield, CT (US); Giuseppe Giordano, Juan-les-Pins (FR); Luca Schiatti, Juan-les-Pins (FR); Hugo Borne-Pons, Juan-les-Pins (FR)

(*) Notice: Subject to any disclaimer, the term of this patent is extended or adjusted under 35 U.S.C. 154(b) by 0 days.

(21) Appl. No.: 16/117,603

(22) Filed: Aug. 30, 2018

(65) Prior Publication Data

US 2019/0305950 A1    Oct. 3, 2019

Related U.S. Application Data

(60) Provisional application No. 62/650,245, filed on Mar. 29, 2018.

(51) Int. Cl.
*H04L 29/08* (2006.01)
*H04L 9/12* (2006.01)
(Continued)

(52) U.S. Cl.
CPC .............. *H04L 9/12* (2013.01); *H04L 9/3239* (2013.01); *H04L 63/12* (2013.01);
(Continued)

(58) Field of Classification Search
CPC ...... G06Q 20/22; G06Q 20/223; G06Q 20/38; G06Q 20/382; G06Q 20/38215; H04L 9/12
See application file for complete search history.

(56) References Cited

U.S. PATENT DOCUMENTS

2015/0278245 A1    10/2015    Sagar et al.
2017/0161734 A1*   6/2017    Bankston ........... G06Q 20/3829
(Continued)

FOREIGN PATENT DOCUMENTS

EP    1 271 318 A2    1/2003
EP    1 271 318 A3    1/2003

OTHER PUBLICATIONS

Aviv Zohar, The myths, the hype, and the true worth of bitcoins, Sep. 2015, ACM (Year: 2015).*
(Continued)

*Primary Examiner* — Ellen Tran
(74) *Attorney, Agent, or Firm* — Brinks Gilson & Lione

(57) ABSTRACT

Systems and methods for active state synchronization between distributed ledger technology (DLT) platforms are provided. A system may store an origin blockchain compliant with an origin DLT. The system may further store a target blockchain compliant with a target DLT. The target DLT may be different from the origin DLT. The system may include a DLT object synchronizer with access to the origin blockchain and the target blockchain. The DLT object synchronizer may receive, from an exchange node, a request to synchronize an origin instance of a DLT object between the origin blockchain and the target blockchain. The DLT object synchronizer may select a target instance of the DLT object on the target blockchain. The DLT object synchronizer may format origin data from the origin instance for compliance with the target DLT. The DLT object synchronizer may synchronize the origin instance and the target instance.

20 Claims, 6 Drawing Sheets

(51) Int. Cl.
*H04L 9/32* (2006.01)
*H04L 29/06* (2006.01)

(52) U.S. Cl.
CPC ...... *H04L 67/1095* (2013.01); *H04L 67/2823* (2013.01); *H04L 2209/38* (2013.01)

(56) References Cited

U.S. PATENT DOCUMENTS

| | | | |
|---|---|---|---|
| 2017/0243214 A1* | 8/2017 | Johnsrud | G06Q 20/401 |
| 2017/0331896 A1* | 11/2017 | Holloway | H04L 67/12 |
| 2018/0025435 A1* | 1/2018 | Karame | G06Q 40/12 |
| | | | 705/30 |
| 2018/0039667 A1* | 2/2018 | Pierce | G06Q 20/0658 |
| 2018/0109541 A1* | 4/2018 | Gleichauf | H04L 63/123 |
| 2018/0145836 A1* | 5/2018 | Saur et al. | H04L 9/3252 |

OTHER PUBLICATIONS

Satoshi Nakamoto, Bitcoin: A Peer-to-Peer Electronic Cash System, 2009, www.bitcoin.org (Year: 2009).*

Extended European Search Report, issued in European Application No. 19162505.2, dated Aug. 16, 2019, European Patent Office, Munich, Germany.

Vitalik Buterin, "Chain Interoperability," dated Sep. 9, 2016, pp. 1-25, published by SquareSpace at the expired URL <https://static1.squarespace.com/static/55f73743e4b051cfcc0b02cf/t/5886800ecd0f68de303349b1/1485209617040/Chain%20Interoperability.pdf>.

Examination Report No. 1, issued in Australian Patent Application No. 2019201733, dated Oct. 16, 2019, pp. 1-4, IP Australia, Phillip, Australia.

* cited by examiner

ACTIVE STATE BLOCKCHAIN SYNCHRONIZATION

CROSS REFERENCE TO RELATED APPLICATIONS

This application claims the benefit of U.S. Provisional Application No. 62/650,245 filed Mar. 29, 2018, the entirety of which is hereby incorporated by reference.

TECHNICAL FIELD

This disclosure relates to distributed ledger technology and, in particular, to blockchain interoperability.

BACKGROUND

A distributed ledger may include a consensus of replicated and synchronized digital data across multiple nodes. Participants of a distributed ledger may apply an agreed upon protocol for, verifying, storing, and maintaining, and modifying information stored in the distributed ledger. In many examples, a distributed ledger may be implemented by way of one or more blockchains implemented in a peer-to-peer network. The unique protocol, technologies, and other design considerations of a particular distributed ledger may inhibit cohesive sharing, synchronization, and/or transferring of information with other distributed ledgers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
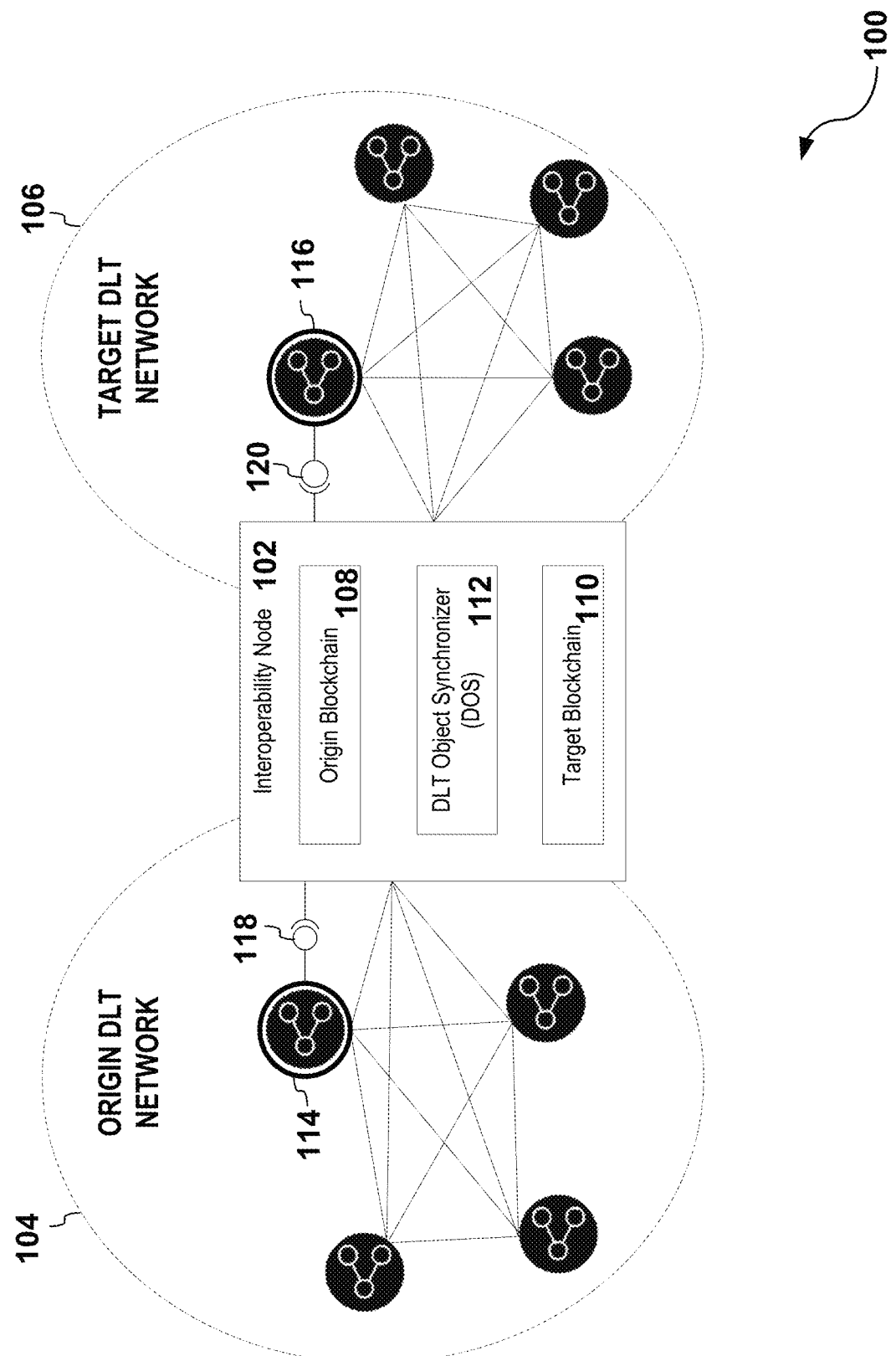
FIG. 1 illustrates a first example of a distributed ledger synchronization system.

A distributed ledger technology (DLT) may apply particular protocols and technologies for participating in the distributed ledger. The unique protocol, technologies, and other design considerations of a DLT may inhibit cohesively sharing, synchronizing, and/or transferring information with other distributed ledgers and/or non-participants. For example, participants of a first DLT may lack the requisite capabilities to communicate with other DLTs, which may limit interoperation and the exchange of information. Alternatively or in addition, the uncoordinated sharing and exchange of information between DLTs may compromise the source of truth provided by each DLT. For example, failure to synchronize the exchange of digital assets between DLTs may result in data inconsistencies, such as double spend—two representations of the same asset existing at the same time.

Accordingly, there is disclosed digital systems and methods for active state object synchronization between DLT networks. By way of an introductory example, the system may store an origin blockchain compliant with an origin distributed ledger technology (DLT) platform. The system may further store a target blockchain compliant with a target DLT platform. In some examples, the target DLT platform may be different from the origin DLT platform. The system may include a DLT object synchronizer with access to the origin blockchain and the target blockchain. The DLT object synchronizer may receive, from an exchange node, a request to synchronize an origin instance of a DLT object between the origin blockchain and the target blockchain. The DLT object synchronizer may select a target instance of the DLT object on the target blockchain. The DLT object synchronizer may format origin data from the origin instance for compliance with the target DLT network. The DLT object synchronizer may synchronize the origin instance and the target instance.

One example of a technical advancement achieved by the systems and methods described below may be common interfaces to an interoperability node may maximize cohesive communications between DLT while minimizing coupling between the DLTs. For example, the interoperability node may participate in multiple DLTs and provide a common interface to modify active state information for data stored in a DLT. In various implementations, active state, may refer to an object state that is accessed and/or maintained to ensure data consistency between one or more DLT networks. Synchronizing objects between DLT networks may refer to facilitating and/or guaranteeing that local copies of data are consistent between two or more blockchains. In some examples, the data in a first blockchain and data stored in a second blockchain may represent the same underlying information, but may be but be stored according to separate data structures and protocols of each respective DLT platform. Data may be considered synchronized across DLT networks if it can be re-created between the DLT networks without loss of information and/or information related to the data, such as transactional history, metadata, ownership information, and/or other information.

Another example of a technical advancement achieved by the system and methods described below may be that active state synchronization between distributed ledger technologies may maintain the guarantees sought by each distributed ledger technology and prevent double spend, and/or other data inconsistencies, between distributed ledger technologies. Accordingly, the active state interoperability architecture improves the operation of the underlying hardware by, for example, improving the efficiency by which hardware resources are provided to process the transferred blockchain data and verify consensus at is initial transfer and over its synchronization life cycle. Alternatively or in addition, data integrity and consistency information stored in memory hardware over a distributed network may be increased.

The systems and methods described herein offer, among other things, technical and operational improvements to blockchain interoperation and/or distributed ledger technology. The additional benefits, efficiencies, and improvements are made evident in the systems and methods described below.

FIG. 1 illustrates a first example of distributed ledger synchronization system 100. The system 100 may provide active state synchronization of token or non-token data between distributed ledgers implemented with various distributed ledger technologies (e.g., Quorum, Hyperledger, and/or other distributed ledger technology (DLT) types).

The system 100 may include an interoperability node 102. The interoperability node 102 may include a virtual or physical network node that communicates with DLT networks, e.g., DLT networks 104 and 106. In general, a DLT network may refer to a group of distributed computing nodes that communicate to maintain information on one or more blockchains according a DLT. The DLT networks 104 and 106 may each include corresponding nodes that run on different DLT platforms (e.g. Quorum, Hyperledger, etc.).

The interoperability node 102 may serve as an intermediary for data transfer and/or data synchronization between the multiple DLT networks 104, 106. The DLT networks 104, 106 may include an origin DLT network 104 and a target DLT network 106. In other examples, the interoperability node 102 may communicate with and may synchronize information between any number of DLT networks. The interoperability node 102 may be a full, or partial, node of the DLT networks 104, 106. For example, the interoperability node 102 may include a local copy of blockchain(s) for the target DLT network 106 and the origin DLT network 104. In other examples, the interoperability node 102 may communicate with one or more nodes that store have blockchains configured on the DLT networks 104, 106.

The origin DLT network 104 may be different from the target DLT network 106. In other words, the origin DLT network 104 may include a group of full or partial nodes that participates in the origin DLT network and not the target DLT platform. For example, nodes of the origin DLT network may store and maintain a first blockchain and nodes of the target DLT network may store and maintain a second blockchain. The nodes of the first DLT network may not have access rights to the second blockchain and the nodes of the second DLT network may not have access rights to the first blockchain. Alternatively or in addition, the origin DLT network 104 may be different from the target DLT network 106 when the target DLT implements a separate kind distributed ledger technology from the origin DLT network 104. In a first example, differing DLT networks may include a group of nodes that implement Quorum vs a group of nodes that implement Hyperledger. In another example, differing DLT network may include a group of nodes that implement separate instances of the same DLT technology.

In some examples, the interoperability node 102 may access one or more nodes that are respectively part of each DLT network. Alternatively or in addition, the interoperability node 102 may access instances of one or more blockchains for the DLT networks 104, 106. For example, the interoperability node 102 may access an origin blockchain 108 and a target blockchain 110. The origin blockchain 108 and the target blockchain 110 may each include a corresponding distributed ledger compliant with a same DLT platform. Alternatively, the origin blockchain may include a distributed ledger according to a first DLT technology, such as Quorum, and the target blockchain 110 may include a distributed ledger according to a distributed ledger according to a second DLT technology, such as Hyperledger.

A blockchain may be compliant with a particular DLT when information in the blockchain is stored and/or organized according rules, standards, protocols, criteria, etc. for the particular DLT. In the example illustrated in FIG. 2, the origin blockchain 108 may be compliant with the origin DLT and the target blockchain 110 may be compliant with the target DLT. In other examples, the interoperability node 102 may include any number of blockchains that are compliant with corresponding DLT networks.

The interoperability node 102 may be authorized to access, modify, and/or interact with the DLT networks 104, 106. For example, the interoperability node 102 may be a trusted node of both the origin DLT network 104 and the target DLT network 106. The interoperability node 102 may receive access rights from the origin DLT network 104 to access, modify, and/or otherwise interact with the origin blockchain 108. Alternatively or in addition, the interoperability node 102 may receive credentials from the target DLT network 106 to access, modify, and/or otherwise interact with the target blockchain 110. In general, the one or more nodes within each respective DLT network may communicate credential(s) for accessing the blockchains for the respective DLT network.

The interoperability node 102 may further include a DLT object synchronizer (DOS) 112. The DOS 112 may access blockchains from various DLT networks and synchronize corresponding information between the DLT networks. For example, the DOS 112 may synchronize information stored in the origin blockchain 108 with corresponding information stored in the target blockchain 110.

The system 100 may further include exchange nodes 114, 116. An exchange node may refer to a node of a DLT network that communicates with the interoperability node 102 to synchronize distributed ledger information. A DLT network may include one exchange node or multiple exchange nodes. Alternatively or in addition, the interoperability node 102 may communicate with exchange node(s) from various corresponding DLT networks. In the example illustrated in FIG. 1, the system 100 may include an origin exchange node 114 and a target exchange node 116. The origin exchange node 114 may be a full node of the origin DLT network 104 and the target exchange node 116 may be a full node of the target DLT network 106. In other examples, the system 100 may include any number of additional or alternative exchange nodes for any number of DLT networks. The exchange nodes 114, 116 may communicate with the interoperability node 102 initiate synchronization, confirm synchronization, establish trust agreements with the interoperability node 102, and/or provide other functionality as described below.

In some examples, the exchange nodes 114, 116 may communicate directly with the interoperability node 102. Alternatively or in addition, one or more of the exchange nodes 114, 116 may communicate with the interoperability node 102 via portal interfaces 118, 120. For example, the portal interfaces 118, 120 may include an origin portal interface 118 and a target portal interface 120. The origin portal interface 118 may provide a communications interface with the interoperability node 102 from the origin DLT network 104. The target portal interface 120 may provide a communications interface with the interoperability node 102 from the target DLT network 106. In other examples, the system 100 may include any number of portal interfaces that provide corresponding communications interfaces to the interoperability node 102 from various DLT networks.

In general, a portal interface, such as the origin portal interface 118 and/or the target portal interface 116, may include an interface between an exchange node and the interoperability node 102. The portal interface may provide a logical or physical endpoint for information synchronization and/or asset transfer between two or more DLT networks. For example, the portal interface may include an application programming interface (API) with a standardized set of operations. A particular DLT network may include a single portal interface or multiple portal interfaces that communicate with the interoperability node 102. Alternatively or in addition, the DLT network 104 may include a separate corresponding portal interface for each respective DLT network in which the DLT network 104 communicates with. In some examples, the portal interface may be included in or execute on the same physical hardware as the exchange node. Alternatively or in addition, the portal interface may be included in or execute on the same physical hardware as the interoperability node 102. In other examples, the portal interface may be included in or execute on an intermediary server in communication with the exchange node and interoperability node 102. The portal interface may execute logic and/or rules based on a corresponding DLT and/or features provided by the interoperability node 102 to handle state transitions in the data synchronization. One or more portals from various DLT networks may be notified at each successful step or failure of the data synchronization between DLTs.

In an example, the portal interfaces 118, 120 may provide a set of operations for DLT object transfer and synchronization between DLT networks. In some examples, the types of information accepted to perform the operations of the portal interfaces 118, 120 may be common between DLT networks. For example, the target portal interface 120 may accept the same types of features to perform a particular operation that the origin portal interface accepts 118. The portal interfaces 118 may be implemented with any relevant API, messaging technology, and/or data-structuring scheme. Table 1 illustrates an example of operations provided by the portals 118, 120.

TABLE 1

| Portal Interface | | | | |
|---|---|---|---|---|
| Function | Parameters | | Returns | |
| createAsset | Info: JSON | | Promise: Resolves to JSON | |
| | Key | Value | Key | Value |
| | origin_asset_id | asset_id on last DLT | success | True if creation is successful, false otherwise |
| | origin_dlt_id | DLT identifier negotiated through portal of last DLT | | |
| | | | data | Optional extra data |
| | | | asset_id | ID of new asset |
| transferAsset | Info: JSON object | | Promise: Resolves to JSON | |
| | Key | Value | Key | Value |
| | asset_id | ID of asset to lock | success | True if asset is successfully locked, false otherwise |
| | | | data | Optional extra data |
| isSynch | Info: JSON object | | Promise: Resolves to JSON | |
| | Key | Value | Key | Value |
| | asset_id | ID of asset to check synch with | success | True if asset is synchronized, false otherwise |
| | target_user_id | ID of the new user in the new DLT | | |
| | target_dlt_id | ID of the DLT it has been transferred to | data | Optional extra data |
| isLocked | Info: JSON object | | Promise: Resolves to JSON | |
| | Key | Value | Key | Value |
| | asset_id | ID of asset to check lock on | success | True if asset is locked, false otherwise |
| | | | data | Optional extra data |
| query | Info: JSON object | | Promise: Resolves to JSON | |
| | Key | Value | Key | Value |
| | asset_id | ID of asset to return state from | success | True if asset exists, false otherwise |
| | | | origin_asset_id | asset_id on last DLT |
| | | | origin_dlt_id | DLT identifier negotiated through portal of last DLT |

The interoperability node 102 may receive messages containing instructions communicated via the portal interfaces 118, 120. In some examples, DLT objects may be synchronized between the origin DLT network 104 and the target DLT network 106. Updates to DLT objects, related description information, and/or meta-information may be shared across the DLT networks and the unicity of the DLT object may be preserved such that all interoperable blockchains provide a truthful source for the DLT object. Synchronization information related to the synchronized state of DLT object may be maintained by the interoperability node 102. For example, the synchronization information may indicate that the DLT object is in-synch with one or more blockchains. Alternatively or in addition, the synchronization information may indicate that the DLT object is out-of-synch in one or more blockchains.

Alternatively or in addition, the interoperability node 102 may facilitate transferring DLT objects between DLT networks. For example, the interoperability node 102 may transfer a DLT object from the origin DLT network 104 to the target DLT network 106. The interoperability node 102 may lock an instance of a DLT object on the origin blockchain 108 in response to transferring or adding an instance of the DLT object to the target blockchain 110.

It is possible that a synched asset can be transferred, and it will remain in a synched state. The synched state conveys that the asset exists in another DLT network and thus any changes made to that asset on a target DLT platform are being notified to the previous owner on another DLT network (e.g., origin DLT network). In addition, a change to the asset made on the previous DLT network is notified to the target DLT network. The synchronized state, on top of the locked state may indicate that all alteration of the asset done post-trade is notified to the new/former holder DLT network. In other implementations, synchronization of DLT objects between DLT networks may occur independently of transfer of DLT objects between DLT networks.

Figure 2:
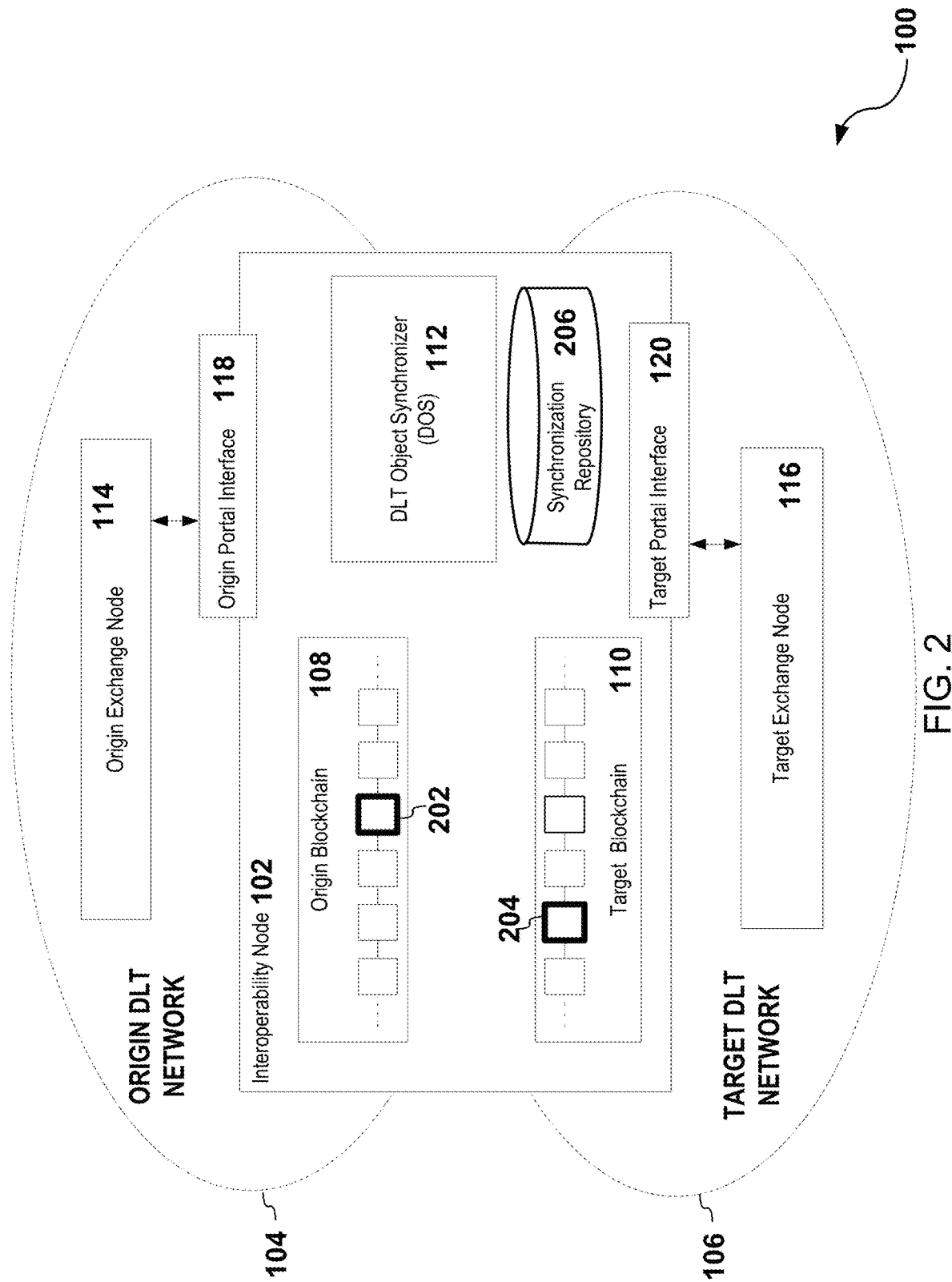
FIG. 2 illustrates an example of an interoperability node.

FIG. 2 illustrates an example of the interoperability node 102. The interoperability 102 may be a full or partial node associated with multiple DLT networks and synchronize information between the DLT networks. For example, the interoperability node 102 may be a full node of the origin DLT network 104 and the target DLT network 106. The interoperability node 102 may include the origin blockchain 108, which may be compliant with the origin DLT network 104 and the target blockchain 110, which is compliant with the target DLT network 106. The interoperability node 102 may respectively follow the protocols of each respective DLT network for adding, updating, accessing, deleting and/or modifying information stored on each corresponding blockchain.

The DOS 112 of the interoperability node 102 may access the origin blockchain 108, the target blockchain 110, and/or other blockchains to perform synchronization between DLT networks. Because the interoperability node 102 may be a full node of the target DLT network 106 and the origin DLT network 104, changes to the origin blockchain 108 and the target blockchain 110 may be propagated to multiple participating nodes according to each respective DLT. The DOS 112 may synchronize one or more DLT objects represented in the supported DLT networks.

As described herein, a DLT object may refer to a group of tokenized or non-tokenized asset data stored on a blockchain. DLT objects may have various types. For example, DLT objects may include programmed assets, dataset, order-dependent data sets and assets, and/or other objects. Mechanisms (such as sidechains) allow tokens from one blockchain to be securely used in a separate blockchain and then be moved back to the original blockchain. Alternatively or in addition, the DLT object may include information related to a tokenized asset. For example, the DLT object may include metadata, descriptions, events, or other information related to, but not directly representative of a digital repetition of an asset.

Programmed assets may include code, scripts, or other non-spendable and/or non-native DLT objects. An example of a programmed asset may include a smart contract, or portions thereof. Programmed assets may be replicated and their state can be kept consistent where the underlying logic (e.g., in the case of code or scripts) is independent with respect to resources or environment factors particularized to a specific DLT. For example, code written in a language native to a first DLT may be transferred to a second DLT with a second, different native language where the logical structure of the code may be translated to the second native language or emulated within the environment of the second DLT.

Additionally or alternatively, programmed assets may be transferable where a particular order of events does not affect the state of the programmed asset. DLTs may resolve disagreements in event sequences through consensus. However, consensus on one DLT may be independent of consensus on a second. Accordingly, different DLTs may not necessarily agree upon a common order for the same events because the DLTs may represent independent consensus regions. Therefore, for an order-dependent programmed asset, the state of the asset on a first DLT may not necessarily inform the proper state for the order-dependent programmed asset on another DLT. In some cases, a portion of an order-dependent programmed asset may be order independent. Accordingly, active state synchronization, as described here in, may also be applied to the order-independent portion.

A dataset, one or more variables and associated values (e.g., states), can be replicated and kept consistent by replicating the data structure across DLTs. Alternatively or in addition, replicating the DLT object across DLT networks may involve replication of value types, supported range values and subroutine logic. As discussed above, in some cases, that state of a DLT object may be order-dependent and replication may involve maintaining the order of information on blockchain. In some cases, order-independent portions of an order-dependent DLT object may be synchronized across different DLTs.

The origin blockchain 108 may include an origin instance 202 of a DLT object and the target blockchain 110 may include a target instance 204 of the DLT object. In general, an instance of the DLT object may refer to a stored representation of the DLT object in a blockchain according to a particular DLT. The instance of the DLT object may be stored in one or more datablocks, depending on the rules, protocols, and standards of the particular DLT network. Updates, events, and other information related to the DLT object may also be stored in the blockchain for the DLT network. In the example illustrated in FIG. 2, the origin instance 202 of the DLT object may include a representation of the DLT object that complies with the origin DLT network 104. The origin instance 202 of the data object may be included in the origin blockchain 108. The target instance 204 of the DLT object may include a representation with the DLT object that complies with the target DLT network 106. The target blockchain 110 may include the target instance 204 of the DLT object.

As information on the origin blockchain 108 and/or the target blockchain 110 are updated, the origin instance 204 may become unsynchronized with the target instance 204. For example, origin instance 202 of the DLT object stored on the origin blockchain 108 may include additional or alternative information than the target instance 204 of the DLT object stored on the target blockchain 110. Alternatively or in addition, the origin blockchain 108 may include additional or alternative datablocks for the origin instance 202 with information related to the DLT object that is not included in the target blockchain 110.

The DOS 112 may synchronize information between the origin blockchain 108 and the target blockchain 110. For example, the DOS 112 may detect that the origin instance 202 of the DLT object and the target instance 204 of the DLT object our out of synch. The DOS 112 may append an update block to the target blockchain 110. The update block may comply with the target DLT network 106 and include information from the origin instance 202 formatted according to the DLT. In some examples, the update block may include a hash of an existing datablock of the target blockchain 110. Alternatively or in addition, the update block may include a reference to a previous block stored on the target blockchain 110. In examples where the target instance 204 spans multiple blocks, the previous block may include at least a portion of the target instance 204.

To translate information between the origin DLT and the target DLT, the DOS 112 may access translation logic. The transition logic may include predetermined logic that accepts the origin instance of the DLT object and formats the information into a form compliant with the target DLT 106. In some examples, the transition logic may be stored in one or more smart contracts stored on the origin blockchain 108, and/or the target blockchain 110. Alternatively or in addition, the translation logic may be provided to the interoperability node to enable interoperability with one or more additional DLT networks. For example, the interoperability node 102 may be re-configured for compliance with an additional DLT network in response the translation logic, and/or blockchain logic, for the additional DLT network being configured on the interoperability node 102.

The interoperability node 102 may include a synchronization repository 206. The synchronization repository 206 may include a memory space, such as a database, for storing and maintaining the active state of DLT objects between DLTs. The synchronization repository 206 may store the aforementioned translation logic for one or more DLT networks. Alternatively or in addition, the synchronization repository 206 may store state information, synchronization proposals and/or synchronization agreements between participants of respective DLTs. The state information may be associated with identifiers of DLT objects, portal interfaces, exchange nodes, and/or blockchains between respective nodes. In some examples, the synchronization repository 206 may include a log of state transitions for DLT objects. Alternatively or in addition, the synchronization repository 206 may be updated to prioritize which DLT network to favor regarding synchronization and reliability of information.

Figure 3:
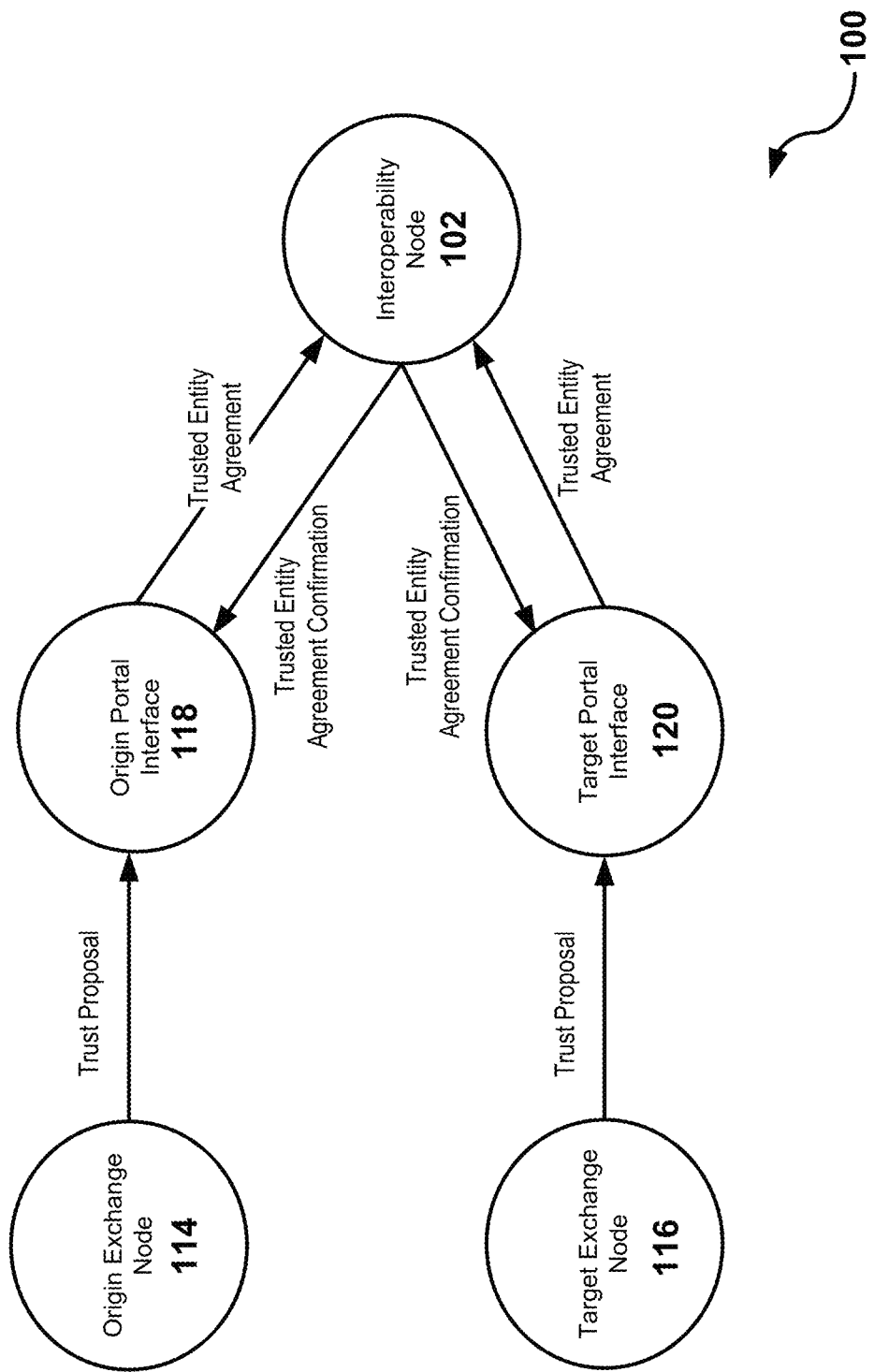
FIG. 3 illustrates a first example of a message flow diagram for a system.

In some examples, the synchronization repository 206 may also store trust proposals and trust agreements established between DLTs. For example, the DLT repository may store associations between one or more portal interfaces, one or more exchange nodes, one or more trust proposals, one or more trust confirmations, and/or one or more trust agreements. FIG. 3 and the following discussion provides further description of the trust proposals, trust confirmations and trust agreements.

FIG. 3 illustrates a first example of a message flow diagram for the system 100. The exchange nodes 114, 116 may communicate with the interoperability node 102 to establish a trusted entity agreement. The trusted entity agreement may be stored on and/or managed by the interoperability node 102. The trusted entity agreement may indicate that the interoperability node 102 is a mutually trusted node between two or more DLT networks. In some examples, the trusted entity agreement may permit the interoperability node 102 to modify a corresponding blockchain of a particular DLT network. For example, the trust entity agreement may grant write access to the DOS 112 for one or more blockchains for the origin DLT network 104 and one or more blockchains for the target DLT network 106. Alternatively or in addition, the trusted entity agreement may permit the interoperability node 102 to communicate messages to parties that are willing to interoperate.

Communications performed to establish the trusted entity agreement may occur via the portal interfaces 118, 120. For example, the origin exchange node 114 may communicate with the interoperability node 102 via the origin portal 118. The target exchange node 116 may communicate with the interoperability node 102 via the target portal interface 120. In other examples, the origin exchange node 114 and the target exchange node 116 may communicate directly with the interoperability node 102.

The origin exchange node 114 may send a trust proposal message to the origin portal 114. The trust proposal message may request that the origin portal interface 118 establish a trusted entity agreement with the target DLT network 106, the target portal interface 120, and/or the target exchange node 116. The trust proposal may designate the origin exchange node 114, the target exchange node 116, the interoperability node 102, the client portal interface, and/or the target portal interface. For example, the trust proposal may include IP addresses, ports, network identifiers, and/or other identifying information to uniquely identify one or more nodes.

In response to receiving the trust proposal message, the origin portal interface 118 may send trusted entity agreement message to the interoperability node 102. The trusted entity agreement message may indicate that the origin portal interface 118 and/or the origin exchange node 114 would like to establish an interoperability agreement with the target portal interface 120 and/or the target exchange node 116. The trust entity agreement message may include the information from the trust proposal message that is organized, formatted, and/or prepared according in a format accepted by the interoperability node 102.

Along the same lines, the target exchange node 116 may communicate a trust proposal message to the target portal interface 120. The trust proposal message may designate the origin exchange node 114, the target exchange node 116, the interoperability node 102, the client portal interface, and/or the target portal interface. For example, the trust proposal may include IP addresses, ports, network identifiers, and/or other identifying information to uniquely identify one or more nodes from one or more DLT networks involved in the trust agreement. In response to receipt of the trust proposal message, the target portal interface 120 may communicate a trusted entity agreement message to the interoperability node 102. The trusted entity agreement message from the target portal interface 120 may indicate that the target exchange node 116 would like to establish an interoperability agreement between the target DLT network 106 and the origin DLT network 104.

In general, the interoperability node 102 may receive trusted entity agreements from multiple DLT exchange nodes and/or portal interfaces. The trusted entity agreement stored on the interoperability node may be flagged as "unconfirmed" until the portals or exchange nodes from each participating DLT network have communicated a proposal for a trusted entity agreement. For example, the interoperability node 102 may receive the trusted entity agreement message from origin portal interface 118 and store the trusted entity agreement. The trusted entity agreement may be flagged as "unconfirmed" until the target exchange node 116 communicates a proposal for the trusted entity agreement. After the interoperability node 102 receives a proposal for a trusted entity agreement message from all relevant portal interfaces, the interoperability node 102 may reflag the trusted entity agreement as "confirmed". Once the trusted entity agreement is flagged as "confirmed", the origin DLT network 104 and the target DLT network 106 may begin performing interoperability communications. For example, the interoperability node 102 may be permitted to synchronize information between the origin DLT network 104 and the target DLT network 106. Alternatively or in addition, the interoperability node 102 may be permitted to modify a blockchain for each DLT to synchronize information between the origin DLT network 104 and the target DLT network 106. Alternatively or in addition, the interoperability established based on the trusted entity agreement may allow respective portal interfaces and/or exchange nodes to process message requests without signing messages.

In some examples, the interoperability node 102 may send a trusted entity agreement confirmation message to one or more of the portals 118, 120. The trusted entity agreement confirmation message may indicate that the trusted entity agreement has been confirmed. For example, the confirmation message may indicate that interoperability between the origin DLT network 104 and the target DLT network 106 may is established. Alternatively or in addition, the origin exchange node 114 may access the origin portal interface 118 to determine the trusted entity agreement has been confirmed. In other examples, the portal interfaces 118, 120 may automatically communicate an event to interested exchange nodes that indicates the trusted entity agreement has been confirmed.

Figure 4:
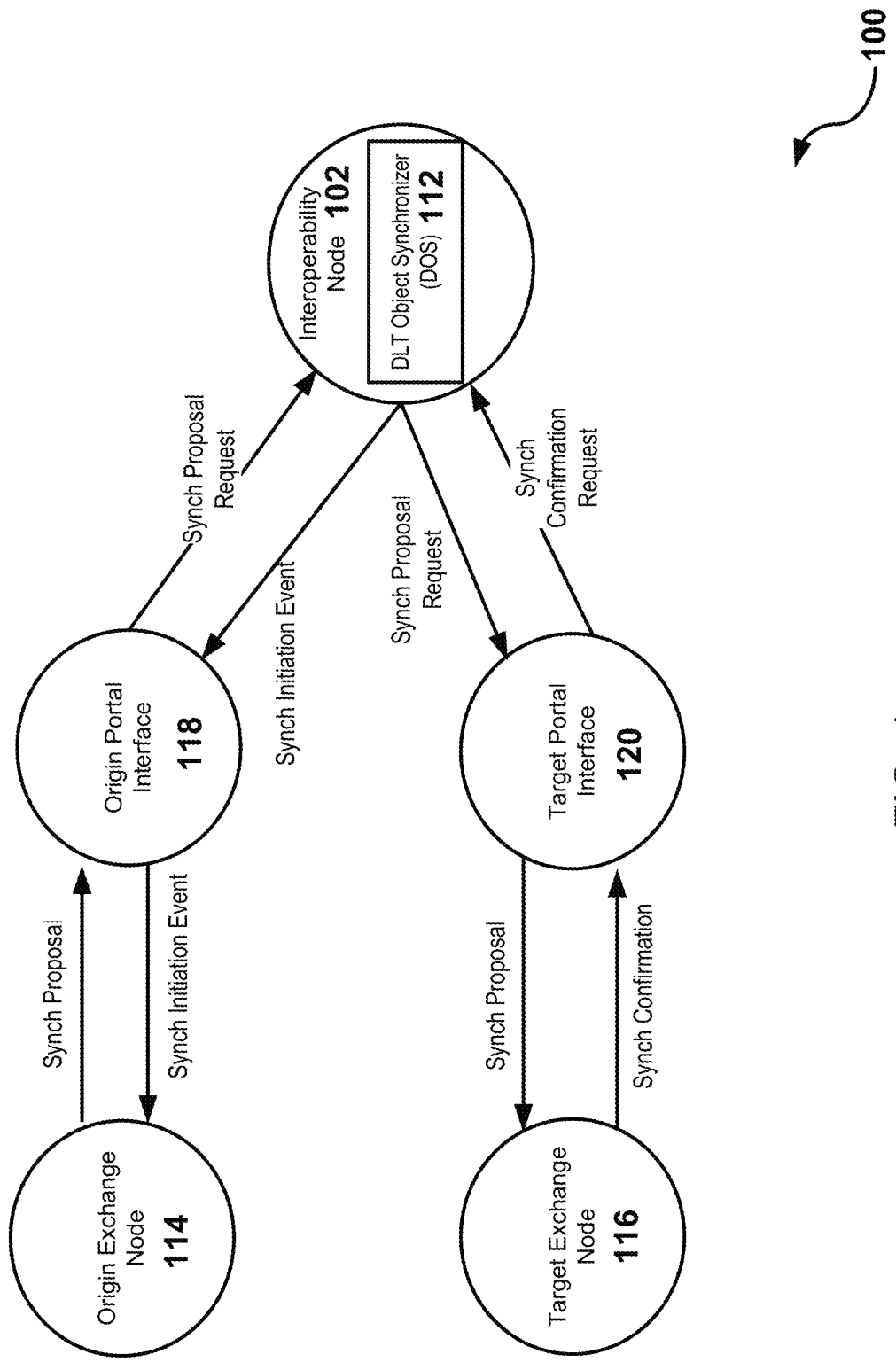
FIG. 4 illustrates a second example of a message flow diagram for a system.

FIG. 4 illustrates a second example of a message flow diagram for the system 100. The protocol for exchanging messages between the exchange servers, portals, and interoperability node 102 for synchronization may be implemented in various ways. In some examples, messages may be sent to the portal and/or interoperability node 102 and either receive an error or an acknowledgement as a response. Alternatively or in addition, the response to a request may indicate that the request was processed. The interoperability node 102 may perform synchronization when state changes are detected based on received messages. In some examples, the interoperability node 102 may send requests to the portals involved with messages describing the state change and those portals may acknowledge those requests by sending an acknowledgement in their response.

The exchange nodes 114, 116 may communicate with the interoperability node 102 to perform synchronization between DLT networks. For example, the interoperability node 102 may store a synchronization agreement. The synchronization agreement may include proposed or agreed upon rules, protocols, criteria, parameters, etc. for synchronizing DLT objects between DLT networks. In some examples, the synchronization agreement may identify one or more DLT objects. For example, the synchronization agreement may include an identifier, a data set, programmed assets, or any other type of DLT object. In some examples, DLT object synchronization may occur only after a DLT object has been transferred from one DLT network to another. In examples where the DLT object is not transferred, the DLT object may be created and/or recreated in both the origin blockchain 108 and the target blockchain 110 before the synchronization occurs. Alternatively or in addition, synchronization occur only after a trusted entity agreement is established.

Communications performed to establish and perform the synchronization agreement may occur via the portal interfaces 118, 120. For example, the origin exchange node 114 may communicate with the interoperability node 102 via the origin portal interface 118. The target exchange node 116 may communicate with the interoperability node 102 via the target portal interface 120. In other examples, the origin exchange node 114 and the target exchange node 116 may communicate directly with the interoperability node 102.

The origin exchange node 114 may transmit a synch proposal to the origin portal interface 118. In response to receiving the synch proposal, the origin portal interface 118 may communicate a synch proposal request to the interoperability node 102 requesting initiation of DLT object synchronization between the origin DLT network 104 and the target DLT network 106. The synch proposal request may include the synch proposal, or details related to the synch proposal. Alternatively or in addition, the synch proposal request may include a request that complies with an API, protocols, and/or communications standards implemented by the interoperability node.

In some examples, the interoperability node 102 may receive a separate synch proposal request from the target portal interface 120. The separate synch propose request may correspond to a synch proposal generated by the target exchange node 116. In examples where both the target exchange node 116 and the origin exchange node 114 communicate synch proposals, the interoperability node 102 may establish a synchronization agreement between the origin exchange node 114 and/or the target exchange node 116. In other examples, the interoperability node 102 may communicate with the origin portal interface 118 and/or the target exchange node 120 to gain confirmation of the synch proposal, as described below.

The interoperability node 102 may communicate the proposal request to one or more exchange nodes in response to receiving a synch proposal request. For example, in response to receiving the synch proposal request from the origin portal interface 118, the DOS 112 may communicate the synch proposal request to the target portal interface 120 and/or the target exchange node 116. The synch proposal request may include the synch proposal, or information related to the synch proposal, provided by the origin portal interface 118. In examples where the target portal interface 120 receives the synch proposal request, the target portal interface 120 may communicate the synch proposal created by the origin exchange node 114, or details related to the synch proposal, to the target exchange node 116. The target portal interface 120 may reformat the synch proposal to a format that complies with an API, protocols, and/or communications standards implemented by the interoperability node 102.

The target exchange node 116 and/or the target portal interface 120 may send a synch confirmation to the DOS 112. The synch confirmation may confirm the target DLT network's wiliness to engage in the synchronization with the origin DLT network 104. Alternatively or in addition, the synch confirmation may authorize synchronization of a DLT object between blockchains. For example, the target exchange node 116 may communicate the synch confirmation message to the target portal interface 120. The target portal interface 120 may communicate a synch confirmation request to the DOS 112. The synch confirmation request may include the synchronization confirmation, or details related to the synchronization confirmation. The synch confirmation request may follow the API, protocols, and/or other communication standards implemented by the interoperability node.

In response to receiving the synch confirmation request, the interoperability node 102 may confirm a synchronization agreement and/or initiate synchronization. For example, the DOS 112 may update the synchronization repository 206 to indicate that synchronization represents an initiation between the origin blockchain 108 and/or the target blockchain 110. For example, the DOS 112 may update the synchronization repository 206 to include the synch proposal, the synch confirmation, and/or the synchronization agreement. Alternatively or in addition, the DOS 112 may update the synchronization repository 206 to indicate that a one or more data objects are synchronized between the origin blockchain 108 and/or the target blockchain 110. The DOS 112 may include associations between identifiers of the synchronization agreement, the origin instance 202 of the data object, the target instance 204 of the data object, the origin blockchain 108 and/or the target blockchain 110.

The interoperability node 102 may communicate a synch initiation event to the origin portal 118 and/or the target portal 120 that indicates the synchronization has been initiated. in order to ensure that the DLT Object is considered "synched", the DOS 112 may move the origin instance and/or the target instance of the DLT object into the "synched" state. The DOS 112 may check that the instances of the DLT object have correspondence on all relevant blockchains. In some examples, the DOS 112 may ensure that latest information corresponding to each instance of the DLT object may be identical on all blockchains.

After the DLT object is synched, the origin portal 118 and/or the target portal 120 may be notified that the DLT object has been synched between DLT networks. If an error in synching occurs, then the synching process may terminate, and an error message may be sent to the origin portal 118 and the target portal 120.

When the DLT object is confirmed synched on all agreed upon DLT networks, the DOS 112 may verify that all instances of the DLT object correspond. If there is a lack of correspondence, the latest update (in terms of block timestamps) may be considered to be the more legitimate state of the DLT object. The DOS 112 may modify the corresponding instance of the DLT object description on the other blockchain(s). In some examples, a blockchain may be missing an instance of a DLT object, or related information. The DOS 112 may create the target instance of the DLT object on the target blockchain to synchronize the DLT object between the origin DLT and the target DLT. For example, the DOS 112 may append one or more datablocks to the target blockchain 110. The datablock may include information corresponding the target instance of the DLT object. Alternatively or in addition, the datablock may include a hash of a previous datablock on the target blockchain 110.

If synchronization fails, the interoperability node 102 may communicate an error message to the portal interfaces and/or exchange nodes that are participants to the synchronization. Otherwise, the relevant portals or exchange nodes may receive a message that indicates the asset synch process is complete.

After all instances of the DLT objects are synchronized, a modification to an instance of a DLT object may trigger the DOS 112 to perform additional synchronization. For example, updates to the DLT object may separately occur to both the origin instance 202 and the target instance 204. In some examples, the origin instance 202 may be updated within the origin DLT network 104 and the target instance 204 may be updated within the target DLT network 106 before a synchronization is performed by the DOS 112. In these circumstances, the DOS 112 may synchronize the origin instance 202 and the target instance 204 by appending target data from the target instance to the origin instance and appending data from the origin instance to the target instance.

In case of conflict between two updates, for example a same DLT object being updated on two or more DLT networks at the same time, a newest block timestamp containing a modification to the DLT object will be prioritized. In the case of identical timestamps, the DLT network with a non-locked DLT object may have priority. Accordingly, the interoperability node 102 may not carry over an outdated update and may determine the latest update and apply it on the DLT network that is outdated.

In examples where the DLT object synchronization occurs after a transfer, the DOS 112 may prioritize the DLT network with the version of the DLT object that is not locked. For example, the DOS 112 may prioritize modifications on the target DLT network 106 and, in case of ambiguity of DLT object information, the DOS 112 may favor target DLT network 106 over the origin DLT network 104.

The protocol for DLT object transfer and synchronization may be implemented in many ways. In some examples, messages may be exchanged between the exchange servers, the portals, and/or the interoperability node 102 via using a RESTful protocol (i.e., REpresentational State Transfer-type protocol), or another suitable communications protocol. A synchronization state (S) may be maintained by the DOS 112. For example, the DOS 112 and/or the interoperability node may maintain a repository that stores information corresponding to S. The repository may associate S with identifiers of blockchains, nodes, and DLT objects of respective DLT networks. In addition, the repository may include a history of state transitions related to S.

The origin exchange node 114 may send the synchronization proposal to the origin portal 118 at route /initiateAssetSynch. When the route /initiateAssetSynch on origin portal 118 is reached from the origin exchange node 114, the origin portal 118 may send am synch request to the DOS 112 at route /establishAssetSynchAgreement. When the route /establishAssetSynchAgreement on the DOS 112 is reached by origin portal 118 (or the origin exchange node 114 as the case may be), the DOS 112 may store the proposal and may associate the proposal with the synchronization state S. At this point, S may indicate "permissioned to synch by sender", and include identifying information of the DLT object, identifying information of the origin portal, the identifying information origin exchange node 114, and/or identifying information of the DLT networks involved in the synchronization.

The target exchange node 116 may send asset synch proposal to the target portal 120 at route /initiateSynchTransfer. When the route /initiateAssetSynch on target portal 120 is reached by the target exchange node 116, the target portal 120 may send an asset synchornization proposal to the DOS 112 at route /establishAssetSynchAgreement. When the route /establishAssetSynchAgreement on the DOS 112 is reached by the target portal 120, the DOS 112 may determine that there is an existing proposal by the other party or parties (i.e. the origin portal 118) involved that matches the proposal from target portal 120. At this point, S is updated to indicate "Permissioned to synch by both Parties". When the asset transfer proposal is confirmed (i.e. when S indicates "Permissioned to synch by both Parties"), the DOS 112 may send a message to the origin portal 118 and to the target portal 120 by routing a message to /receivedPermissionToSynch. The message may indicate that the asset synch proposal has been confirmed by all parties. At this point, the actual asset synch may begin.

To perform the asset synchronization, the DOS 112 may determine whether a DLT object and/or associated descriptions and metadata correspond. If there is no correspondence, then the blockchain with the outdated information is updated. When the asset data on the origin DLT network 104 is synchronized, the DOS 112 may update the asset state S to indicate "Asset Synched on Origin DLT". When the asset state on the target DLT network 106 is synchronized, the DOS may update S to indicate "Asset Synched on Target DLT." When the DOS 112 confirms the asset is synched on all DLT networks, the DOS 112 may send a message to the origin portal and the target portal via route /confirmedAssetSynch. The DOS 112 may finalizes the asset synch process. For example, S may be set to "Asset Synch Complete".

Figure 5:
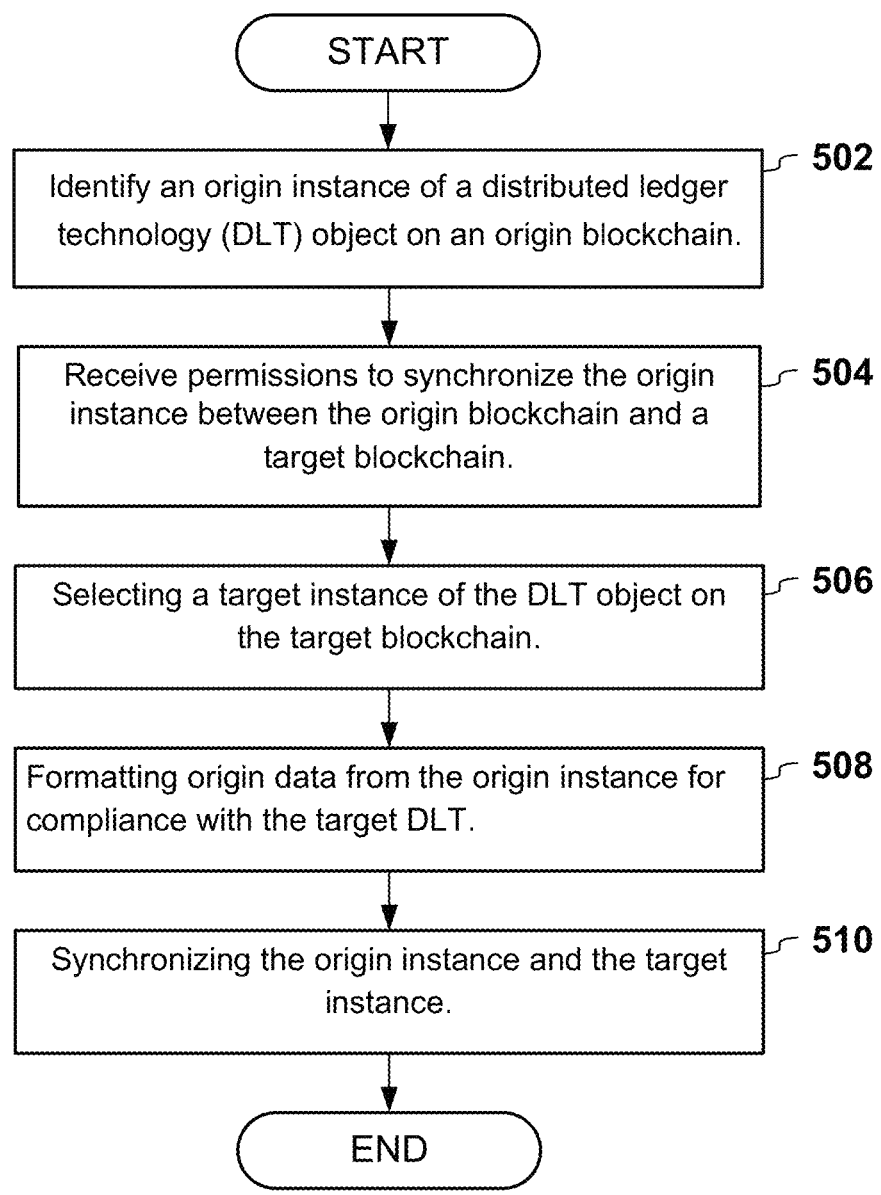
FIG. 5 illustrates a flow diagram of an example of logic for a system.

FIG. 5 illustrates a flow diagram of an example of logic for the system 100. The interoperability node 102 may identify an origin instance 202 of a DLT object on an origin blockchain 108 (502). The origin instance 202 of the DLT object may be included the origin blockchain 108. In some examples, the origin blockchain 108 may be located in a memory of the interoperability node 102. Alternatively or in addition, the origin blockchain 108 may be configured on a separate node and accessible by the interoperability node 102.

The interoperability node 102 may receive permission to synchronize the origin instance 202 between the origin blockchain 108 and the target blockchain 110 (504). For example, the interoperability node 102 may facilitate a permission exchange between exchange nodes. The permission exchange may include, for example, receiving a synch proposal from the origin exchange node 114. The synch proposal may include a message from origin exchange node 114 requesting synchronization of the origin instance 202 of the DLT object and the target instance 204 of the DLT object. The permission exchange may further include receiving a synch confirmation from the target exchange node 116. The synch confirmation may be sent from the target exchange node 116 in response to the synch proposal. The synch confirmation may authorize synchronization of the origin instance 202 and the target instance 204. In other examples, the origin exchange node 114 and the target exchange node 116 may both send synch proposals. The interoperability node 102 may initiate the synchronization process when synch proposals are received from each exchange node.

The interoperability node 102 may select the target instance 204 of the DLT object on the target blockchain 110 (506). The target instance 204 of the DLT object may be included the target blockchain 110. The target blockchain 110 may be located in a memory of the interoperability node 102. Alternatively or in addition, the target blockchain 110 may be configured on a separate node and accessible by the interoperability node 102.

The interoperability node 102 may format origin data from the origin instance 202 for compliance with the target DLT (508). For example, the origin data may follow a specific format, data structure, or protocol prescribed by the DLT platform of the origin DLT network 104. The interoperability node 102 may access rules and/or logic that specify how to translate the origin data for compliance with the target DLT platform of the target DLT network 106. Alternatively or in addition, the origin data may include a self-executing contract logic. The interoperability node 102 may format the origin data from the origin instance by translating the self-executing contract logic for an execution environment supported by the target DLT network 106.

The interoperability node 102 may synchronize the origin instance 202 and the target instance 204 (510). For example, the interoperability node 102 may append active state information to the target blockchain 110 and/or the origin blockchain 108 to synchronize the DLT object between DLT networks. Alternatively or in addition, the interoperability node may update a synchronization repository with the active state information. The active state information may indicate whether a DLT object is synchronized between blockchains. For example, the active state information may identify the origin instance 202 of the DLT object, the target instance 204 of the DLT object and/or a synchronization indicator. The synchronization indicator may indicate the synchronization state of the DLT object between the blockchains 108 and 110. For example, the synchronization indicator may indicate that the DLT object is synchronized or not synchronized. In some examples, the interoperability node 102 may monitor the origin instance 202 and/or the target instance 204 for updates after an initial synchronization. Alternatively or in addition, the interoperability node 102 may monitor the origin instance 202 and/or target instance 204 while the synchronization is permitted by the exchange nodes.

In some examples, the interoperability node 102 may lock the origin instance. A locked origin instance may prohibit further interactions with the origin blockchain 108 that modify the origin instance. Alternatively or in addition, locking the origin instance may prohibit further modifications to the origin instance within the origin DLT network 104 while allowing modifications to the origin instance within the target DLT. For example, the interoperability node 102 may reject a first update the origin instance received on the blockchain and update the origin instance in response to a second update received on the target blockchain 110.

The processing steps may include additional, different, or fewer operations than illustrated in FIG. 5. Furthermore, the steps may be executed in a different order than illustrated in FIG. 5. In some examples, the DOS 112 may determine whether a trusted entity relationship between the origin exchange node 114 and the target exchange node 116 has been confirmed. The DOS 112 may establish and/or control access to the origin blockchain and the target blockchain 110 based on a confirmed trusted entity agreement. For example, the DOS 112 may receive a first trust proposal from the origin exchange node 114. The DOS 112 may receive a second trust proposal and/or a trust confirmation from the target exchange node 116. The DOS 112 may extra access permissions for the origin blockchain 108 and the target block chain from the received trust proposal and trust confirmation.

The system 100 may be implemented with additional, different, or fewer components than illustrated. Each component may include additional, different, or fewer components.

Figure 6:
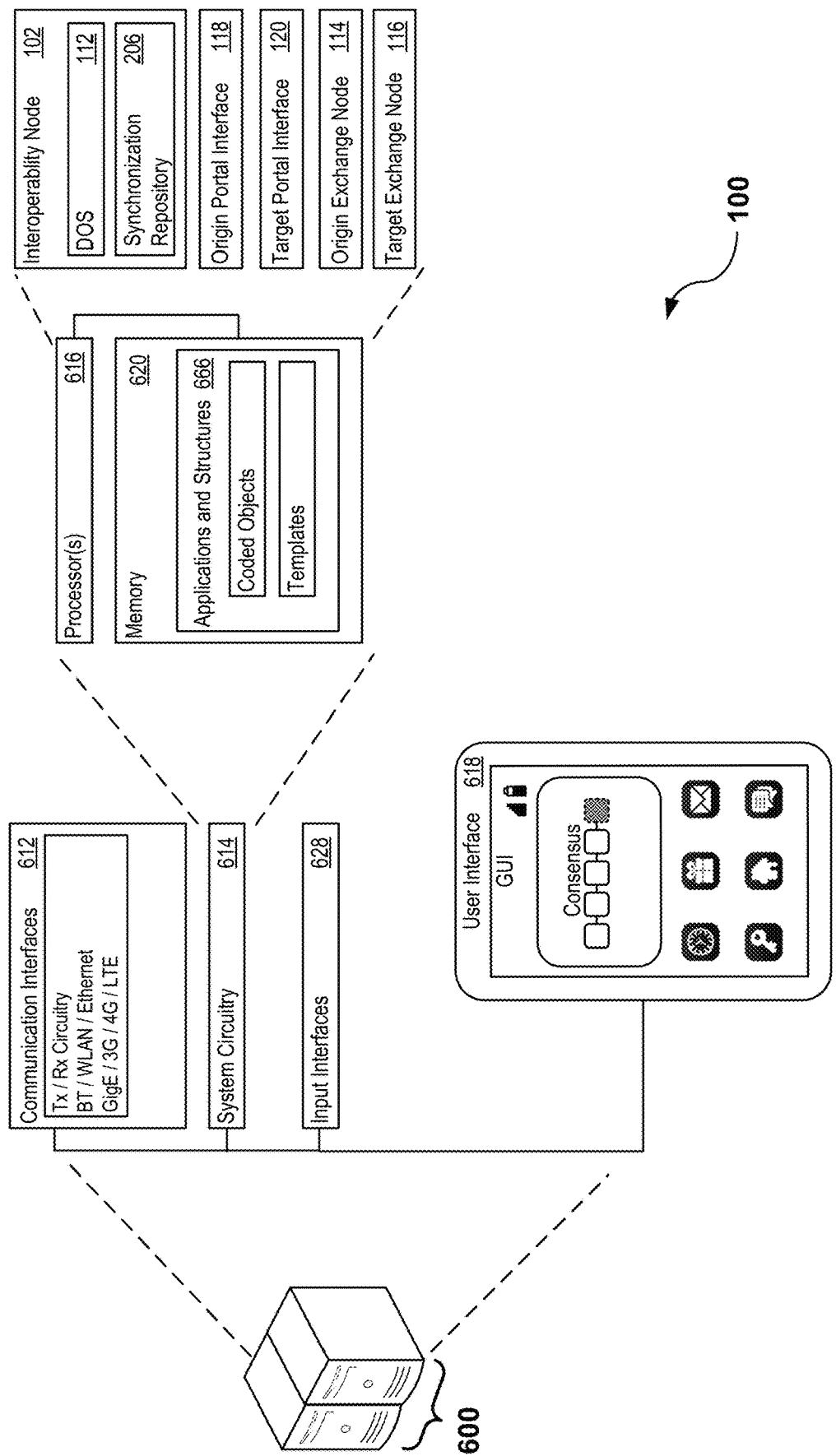
FIG. 6 illustrates an example of an execution environment for a system.

FIG. 6 illustrates an example of an execution environment 600 for the system 100. The execution environment 600 may serve as a hardware platform for the components of the system. The execution environment may include communication interfaces 612, input interfaces 628 and/or system circuitry 614.

The system circuitry may include a processor 616 or multiple processors. Alternatively or in addition, the system logic may include memory 620.

The processor 616 may be in communication with the memory 620. In one example, the processor 616 may also be in communication with additional elements, such as the communication interfaces 612 and/or the input interfaces 628. Examples of the processor 616 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 616 may be one or more devices operable to execute logic. The logic may include computer executable instructions or computer code stored in the memory 620 or in other non-transitory memory that when executed by the processor 602, cause the processor 616 to perform the features implemented by the logic of the interoperability node 102, the DOS 112, the synchronization repository 206, the origin exchange node 114, the target exchange node 116, the origin portal interface 118, the target portal interface 120, and/or the system 100. The computer code may include instructions executable by processor 616.

The memory 620 may be a device for storing and retrieving data or any combination thereof. The memory 620 may include non-volatile and/or volatile memory, such as a random access memory (RAM), a read-only memory (ROM), an erasable programmable read-only memory (EPROM), or flash memory. Alternatively or in addition, the memory 620 may include an optical, magnetic (hard-drive) or any other form of data storage device.

The memory 620 may include at least one of the interoperability node 102, the DOS 112, the synchronization repository 206, the origin exchange node 114, the target exchange node 116, the origin portal interface 118, the target portal interface 120, and/or the system 100. In addition, the memory may include one or more other components previously discussed, such as origin DLT network, the target DLT network, and/or other components of the system 100 described herein. Alternatively, the origin exchange node 114, and/or the target exchange node 116, may reside in memory of other execution environment hardware specific to the origin and/or target DLTs.

The system 100 may be implemented in many different ways. For example the components of the system may be hardware or a combination of hardware and software. The components may include the interoperability node 102, the DOS 112, the synchronization repository 206, the origin exchange node 114, the target exchange node 116, the origin portal interface 118, the target portal interface 120, the system 100 and/or other components and subcomponents of the system 100 described herein. For example, each component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 620, for example, that comprises instructions executable with the processor 616 or other processor to implement one or more of the features of the circuitry. When any one of the components includes the portion of the memory that comprises instructions executable with the processor 616, the component may or may not include the processor 616. In some examples, each component may just be the portion of the memory 620 or other physical memory that comprises instructions executable with the processor 602 or other processor to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A cryptographic system for interoperability between distributed ledger technology networks, the cryptographic system including:
   an interoperability node in communication with an origin distributed ledger technology (DLT) network and a target DLT network, the origin DLT network including origin nodes, the origin nodes including respective blockchains of an origin distributed ledger, the target DLT network including target nodes, the target nodes including respective blockchains of a target distributed ledger, the target distributed ledger validated based on consensus among the target nodes independent of consensus among the origin nodes, the interoperability node including:
      an origin memory, the origin memory storing an origin blockchain included among the respective blockchains of the origin distributed ledger for the origin DLT network;
      a target memory, the target memory storing a target blockchain included among the respective blockchains of the target distributed ledger for the target DLT network; and
      DLT object synchronization (DOS) circuitry, the DOS circuitry having access to the origin blockchain and the target blockchain, and the DOS circuitry configured to:
         receive a request to synchronize an origin instance of a DLT object between the origin blockchain and the target blockchain, the origin instance stored in the origin blockchain,
         select a target instance of the DLT object, the target instance stored on the target blockchain,
         format a first set of data for compliance with the target DLT network, the data from the origin instance, format a second set of data for compliance with the origin DLT network, the second data from the target instance, and
         synchronize the origin instance and the target instance, wherein the formatted first set of data from the origin instance is appended to the target blockchain and validated for the target blockchain based on the consensus among the target nodes without regard to the consensus among the origin nodes, and the formatted second set of data from the target instance is appended to the origin blockchain and validated for the origin blockchain based on the consensus among the origin nodes without regard to the consensus among the target nodes.

2. The cryptographic system of claim 1, where the DLT object includes at least one of:
   a non-tokened asset, or
   a reference dataset to be replicated across the origin blockchain and the target blockchain.

3. The cryptographic system of claim 1, where:
   the DLT object includes self-executing contract logic supported by the origin DLT network; and
   the DOS circuitry is further configured to:
   format the data from the origin instance by translating the self-executing contract logic for an execution environment supported by the target DLT instead of the origin DLT network.

4. The cryptographic system of claim 1, wherein the request to synchronize the origin instance is received from an origin node and the origin node stores a copy of the origin blockchain that is validated based on a consensus protocol of the origin DLT network.

5. The cryptographic system of claim 1, wherein the request to synchronize the origin instance is received from a target node and the target node stores a copy of the target blockchain that is validated based on a consensus protocol of the target DLT network.

6. The cryptographic system of claim 1, where the request includes a permission exchange between the origin node of the origin DLT network and a target node of the target DLT network, the permission exchange including:
   a synch proposal to synchronize the origin instance and the target instance; and
   a synch confirmation, responsive to the synch proposal, authorizing synchronization of the origin instance and the target instance.

7. The cryptographic system of claim 6, where the DOS circuitry is configured to:
   pass the synch proposal to the target node;
   pass the synch confirmation to the origin node; and
   after receiving the synch confirmation, notify the origin node and the target node of initiation of the synchronization of the origin instance and the target instance.

8. The cryptographic system of claim 6, where the DOS circuitry is configured to establish the access to the origin blockchain and the target blockchain by:
   receiving a trust proposal from the origin node;
   receiving a trust confirmation from the target node; and
   extracting one or more access permissions for the origin blockchain and the target blockchain,
      the one or more access permissions extracted from the trust proposal and trust confirmation.

9. The cryptographic system of claim 8, where the DOS circuitry is configured to establish the access to the origin blockchain and the target blockchain by holding the trust proposal in an unconfirmed state during a time period after receiving the trust proposal and prior to receiving the trust confirmation.

10. The cryptographic system of claim 1, where the DOS circuitry is further configured to select a target instance of the DLT object by creating the target instance of the DLT object on the target blockchain.

11. The cryptographic system of claim 1, where the DOS circuitry is further configured to synchronize the origin instance and the target instance by appending target data from the target instance to the origin instance after first appending data from the origin instance to the target instance.

12. The cryptographic system of claim 1, where the DOS circuitry is further configured to synchronize the origin instance and the target instance by monitoring the origin instance and the target instance for updates after an initial synchronization.

13. The cryptographic system of claim 1, where the DOS circuitry is further configured to insert a synchronization agreement in a synchronization repository, the synchronization agreement comprising an association between a identifier of the origin instance and an identifier of the target instance.

14. The cryptographic system of claim 13, where the DOS circuitry is further configured to:
   monitor, in response to insertion of the synchronization agreement in the synchronization repository, the origin blockchain for update data corresponding to the target instance; and
   identify the data on the origin blockchain, wherein the data comprises updates to the origin instance.

15. A product including:
   machine-readable media other than a transitory signal; and
   instructions stored on the machine-readable media, the instructions, when executed, configured to, cause object synchronization circuitry to:
      access an origin memory storing an origin blockchain, the origin blockchain validated based on a consensus protocol of an origin distributed ledger technology (DLT) network,
      access a target memory storing a target blockchain, the target blockchain validated based on a consensus protocol of a target DLT network, and the consensus protocol of the target DLT network being different from the consensus protocol of the origin DLT network,
      receive, from a first exchange node of the target DLT network, a request proposal to synchronize an origin instance of a DLT object and a target instance of the DLT object, the origin instance stored on the origin blockchain and the target instance stored on the target blockchain,
      receive, from a second exchange node of a target DLT network, a confirmation to the proposal,
      generate a synchronization agreement in response to receipt of the proposal and the confirmation, the synchronizations agreement comprising an association between the origin instance and the target instance,
      determine, based on the synchronization agreement, the target instance of the DLT object is unsynchronized with the origin instance of the DLT object,
      format data from the origin instance for compliance with the target DLT network, and
      synchronize the origin instance and the target instance wherein the instructions to synchronize the origin instance and the target instance are further configured to cause the object synchronization circuitry to:
         validate the formatted data based on the consensus protocol of the target DLT network without regard to any validation of data from the target instance using the consensus protocol of the origin DLT network, and
         append the formatted data to the target blockchain in response to the formatted data being validated.

16. The product of claim 15, where the instructions are further configured to cause the object synchronization circuitry to synchronize the origin instance and the target instance by appending an update block to the target blockchain, the update block comprising:
   a hash of an existing block on the target blockchain;
   a reference to a previously stored block that includes at least a portion of the target instance; and
   the formatted data after formatting for compliance with the target DLT.

17. interoperability node in communication with an origin DLT network and a target DLT network, an origin instance of a distributed ledger technology (DLT) object on an origin blockchain, the origin instance compliant with an origin DLT network;
   exchanging, between a node of the origin DLT network and a target node of the target DLT network, permissions to synchronize the origin instance between the origin blockchain and a target blockchain, wherein the node of the origin DLT network is not a participant of the target DLT network and the target node of the target DLT network is not a participant of the origin DLT network; and in response to the permissions being exchanged, determining, by the interoperability node, that a target instance of the DLT object on the target blockchain and an origin instance of the DLT object on the origin blockchain are unsynchronized, formatting, by the interoperability node, data corresponding to the origin instance for compliance with the target DLT network, formatting, by the interoperability node, data corresponding to the target instance for compliance with the origin DLT network, and synchronizing, by the interoperability node, the origin instance and the target instance by appending the formatted data corresponding to the origin instance to the target blockchain and appending the formatted data corresponding to the target instance to the origin blockchain, where:

appending the formatted data corresponding to the origin instance to the target blockchain includes causing validation of the formatted data corresponding to the origin instance via a specific occurrence of consensus within the target DLT network; and appending the formatted data corresponding to the target instance to the origin blockchain causing validation of the formatted data corresponding to the target instance with regard to the specific occurrence of consensus within the target DLT network.

18. The cryptographic method of claim 17, where exchanging the permissions includes exchanging a trust proposal and a trust confirmation, the trust proposal and trust confirmation designating the node of the origin DLT network, the target node of the target DLT network, and the interoperability node of the origin DLT network and the target DLT network.

19. The cryptographic method of claim 18, where exchanging the permissions further includes exchanging a DLT proposal and a DLT confirmation, the DLT proposal and the DLT confirmation granting write access to the interoperability node for the origin DLT network and the target DLT network.

20. The cryptographic method of claim 17, wherein synchronizing the origin instance and the target instance further comprises:

prioritizing the target instance over the origin instance;

identifying update data corresponding to the target instance on the target blockchain and update data corresponding to the origin instance on the origin blockchain; and updating the origin instance with the updates to the target instance in response to prioritizing the target instance over the origin instance.

\* \* \* \* \*

UNITED STATES PATENT AND TRADEMARK OFFICE
CERTIFICATE OF CORRECTION

PATENT NO. : 10,721,065 B2
APPLICATION NO. : 16/117603
DATED : July 21, 2020
INVENTOR(S) : David Treat et al.

Page 1 of 1

It is certified that error appears in the above-identified patent and that said Letters Patent is hereby corrected as shown below:

In the Claims

In Column 22, Claim 17, Line 56, insert the following language at the beginning of the claim, in front of "Interoperability":
--A crypographic method including:
identifying, by an--.

Signed and Sealed this
Twentieth Day of October, 2020

Andrei Iancu
*Director of the United States Patent and Trademark Office*